(12) United States Patent
Patel et al.

(10) Patent No.: US 11,038,389 B2
(45) Date of Patent: Jun. 15, 2021

(54) ROTOR END PLATE

(71) Applicant: Hamilton Sundstrand Corporation, Charlotte, NC (US)

(72) Inventors: Dhaval Patel, Loves Park, IL (US); Edward C. Allen, Davis, IL (US); Glenn C. Lemmers, Jr., Loves Park, IL (US); Andrew R. Wilkinson, Cherry Valley, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 133 days.

(21) Appl. No.: 16/112,102

(22) Filed: Aug. 24, 2018

(65) Prior Publication Data
US 2020/0067359 A1  Feb. 27, 2020

(51) Int. Cl.
| | |
|---|---|
| *H02K 1/30* | (2006.01) |
| *H02K 3/52* | (2006.01) |
| *H02K 15/02* | (2006.01) |
| *F02C 7/26* | (2006.01) |
| *H02K 15/16* | (2006.01) |

(52) U.S. Cl.
CPC ............... *H02K 1/30* (2013.01); *H02K 3/527* (2013.01); *H02K 15/02* (2013.01); *F02C 7/26* (2013.01); *H02K 15/165* (2013.01)

(58) Field of Classification Search
CPC  H02K 1/24; H02K 1/26; H02K 1/265; H02K 1/28; H02K 1/30; H02K 3/52; H02K 3/527; H02K 9/19; H02K 15/16
USPC ............................. 310/216.113–216.117, 270
See application file for complete search history.

(56) References Cited

U.S. PATENT DOCUMENTS

| | | | | |
|---|---|---|---|---|
| 2,683,233 A | * | 7/1954 | Ruhl | H02K 3/51 310/270 |
| 3,694,906 A | * | 10/1972 | Rank | H02K 1/28 29/598 |
| 9,166,454 B2 | * | 10/2015 | Chun | H02K 3/46 |
| 2003/0094872 A1 | * | 5/2003 | Tornquist | H02K 3/527 310/91 |
| 2010/0007231 A1 | * | 1/2010 | Imazawa | H02K 11/046 310/91 |

(Continued)

FOREIGN PATENT DOCUMENTS

JP  2013009553 A  *  1/2013  ............. H02K 15/03

OTHER PUBLICATIONS

Aiki, Machine Translation of JP2013009553, Jan. 2013 (Year: 2013).*

(Continued)

*Primary Examiner* — Quyen P Leung
*Assistant Examiner* — Eric Johnson
(74) *Attorney, Agent, or Firm* — Locke Lord LLP; Joshua L. Jones; Gabrielle L. Gelozin

(57) ABSTRACT

An electrical machine includes a rotor including windings circumferentially spaced apart by rotor wedges. The electrical machine includes a rotor end plate mounted to the rotor. The rotor end plate includes an annular end plate body with an interior surface and axially opposed exterior surface. The interior surface includes a cavity for engaging the rotor. The interior surface has a base that is bounded by an inner rim and an outer rim radially opposite the inner rim. The interior surface is free of anti-rotation projections extending axially therefrom. The outer rim is free of anti-rotation features extending radially inward therefrom.

14 Claims, 3 Drawing Sheets

(56) References Cited

U.S. PATENT DOCUMENTS

| | | | |
|---|---|---|---|
| 2010/0244614 A1* | 9/2010 | Rasmussen | H02K 3/487 310/214 |
| 2010/0283352 A1* | 11/2010 | Lemmers, Jr. | H02K 1/22 310/216.115 |
| 2015/0022035 A1* | 1/2015 | Yamada | H02K 9/197 310/54 |
| 2017/0353092 A1 | 12/2017 | Park et al. | |

OTHER PUBLICATIONS

Extended European Search Report dated Jan. 7, 2020, issued during the prosecution of European Patent Application No. EP 19192822.5.

* cited by examiner

ROTOR END PLATE

BACKGROUND OF THE INVENTION

1. Field of the Invention

The present disclosure relates to electrical machines, and more particularly to rotor end plates for electrical machines such as motors, generators and motor/generators such as starter motor/generators used to start a gas turbine engine in a motor mode and to operate in a generator mode after the engine is started.

2. Description of Related Art

Typically an electrical machine includes a rotor having a plurality of field coils or windings. For generators, the rotor is driven to rotate by some source of rotation power, such as a turbine rotor. The rotor rotates in proximity to a stator, and the rotation of the rotor creates oscillating magnetic fields which generate electrical current in the stator windings. In motors, electrical currents in the stator windings create oscillating magnetic fields which interact with the rotor to drive the rotor rotationally.

A typical electrical machine rotor includes end plates that sit on the axial facing end surfaces of the rotor. The end plates can provide a reaction surface for radial forces of rotor wedges, can enclose rotor end windings if applicable, and can provide sealing for any cooling fluids circulating in the rotor if applicable.

The conventional techniques have been considered satisfactory for their intended purpose. However, there is an ever present need for improved rotor end plates. This disclosure provides a solution for this need.

SUMMARY OF THE INVENTION

An electrical machine includes a rotor including windings circumferentially spaced apart by rotor wedges. The electrical machine includes a rotor end plate mounted to the rotor. The rotor end plate includes an annular end plate body with an interior surface and axially opposed exterior surface. The interior surface defines a fully annular cavity for engaging the rotor. The interior surface has a base that is bounded by an inner rim and an outer rim radially opposite the inner rim. The interior surface is free of anti-rotation projections extending axially therefrom. The outer rim is free of anti-rotation features extending radially inward therefrom.

The inner rim can be free of anti-rotation features projecting radially outward therefrom. The interior surface can be free of discrete pockets defined therein. The exterior surface can include a full-annular pocket free of axial and radial projections therein. The exterior surface can include a plurality of balancing bores, wherein the balancing bores form an uninterrupted circumferential pattern fully around the exterior surface.

An annular insulator sheet can be engaged between the interior surface and the windings for electrical isolation of the windings from the rotor end plate. The annular insulator sheet can have an outer perimeter that is circumferentially uninterrupted and is free of anti-rotation features.

A plurality of fastener bores can be defined axially through the end plate body, and respective fasteners can be received through the fastener bores joining the end plate to the rotor. A roll pin bore can be defined axially into the end plate body, and a roll pin can be received in the roll bin bore and is engaged with the rotor for anti-rotation relative to the rotor.

At least a portion of the interior surface and at least a portion of the exterior surface can be formed by a process including rotation on a lathe. The rotor end plate can include titanium.

A method of making a rotor end plate for an electrical machine includes forming an interior surface on a rotor end plate using a lathe. The method includes forming an exterior surface axially opposed to the interior surface using a lathe. Forming the interior and exterior surfaces can include lathing the interior and exterior surfaces into a titanium rotor end plate work piece.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
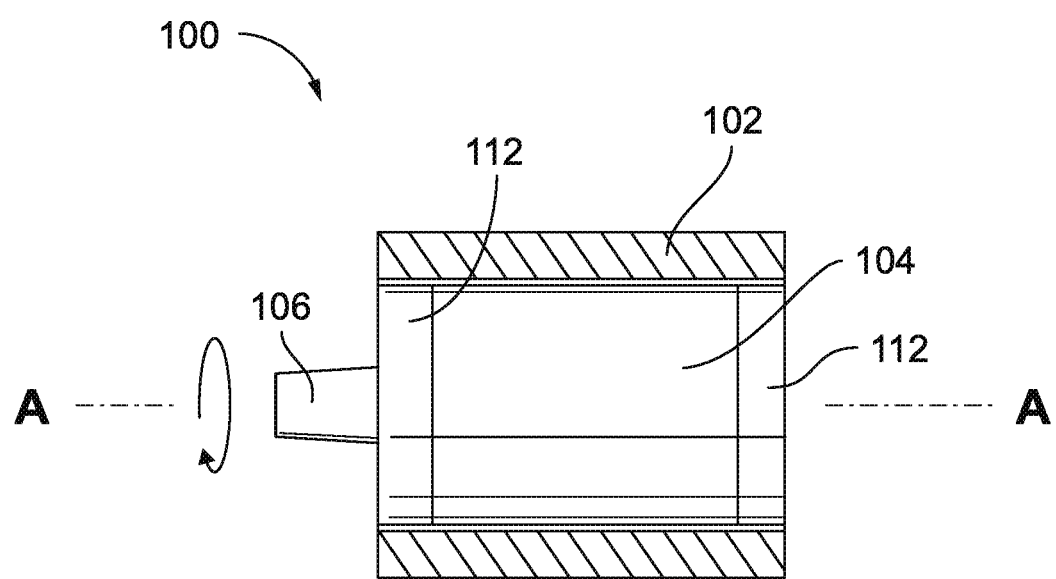
FIG. 1 is a schematic cross-sectional side elevation view of an exemplary embodiment of an electrical machine constructed in accordance with the present disclosure, showing the rotor and stator.

Reference will now be made to the drawings wherein like reference numerals identify similar structural features or aspects of the subject disclosure. For purposes of explanation and illustration, and not limitation, a partial view of an exemplary embodiment of an electrical machine in accordance with the disclosure is shown in FIG. 1 and is designated generally by reference character 100. Other embodiments of electrical machines in accordance with the disclosure, or aspects thereof, are provided in FIGS. 2-6, as will be described. The systems and methods described herein can be used to provide rotor end plates for electrical machines with improved performance and ease of manufacture relative to traditional configurations.

The electrical machine 100 includes a stator 102 radially outward from a rotor 104. In a motor mode, the stator imposes magnetic fields on the rotor 104 to drive the rotor around the rotation axis A to provide rotational power output to the shaft 106 of the rotor 104. In a generator mode, the rotational power is input to the shaft 106 to drive the rotor around the rotation axis A. Oscillating magnetic fields from the rotor induce electric currents in the stator 102 that can provide electrical power.

Figure 2:
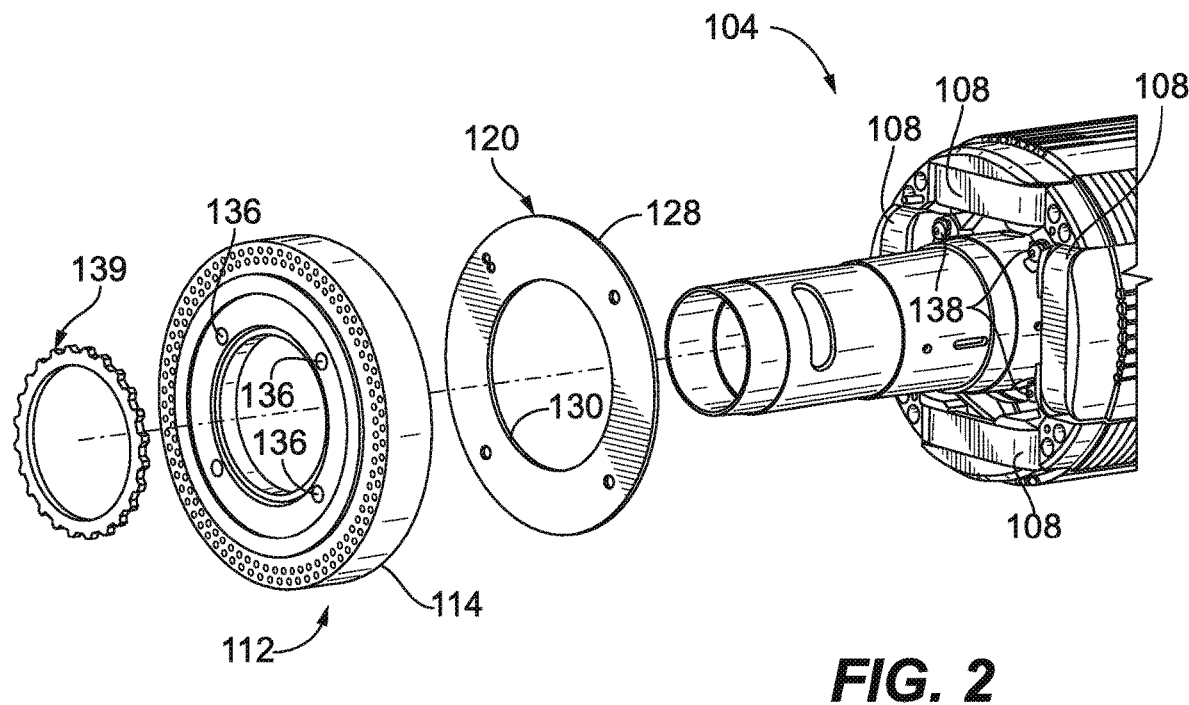
FIG. 2 is an exploded perspective view of the rotor of FIG. 1, showing the rotor end plate.

With reference now to FIG. 2, the rotor 104 includes windings 108 circumferentially spaced apart by rotor wedges 110. A respective rotor end plate 112 is mounted to each axial end of the rotor (only one rotor end plate 112 is shown in FIG. 2, but see FIG. 1). The rotor end plate 112 includes an annular end plate body 114 with an interior surface 116 (shown in FIGS. 3 and 4) and an axially opposed exterior surface 118. The interior surface 116 defines a fully annular cavity for engaging the rotor 104 with an annular insulator sheet 120 engaged between the interior surface 116 and the windings 108 for electrical isolation of the windings 108 from the rotor end plate 112. The end plate 112 can thus seal the axial end of the rotor 104, e.g., for circulation of coolant fluid within the rotor 104.

Figure 3:
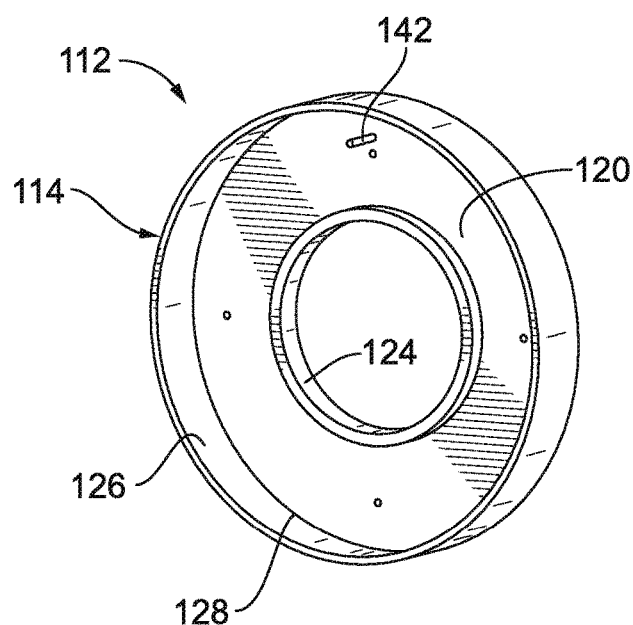
FIG. 3 is a perspective view of the rotor end plate of FIG. 2, showing the insulator sheet assembled onto the interior surface and roll pin.
Figure 4:
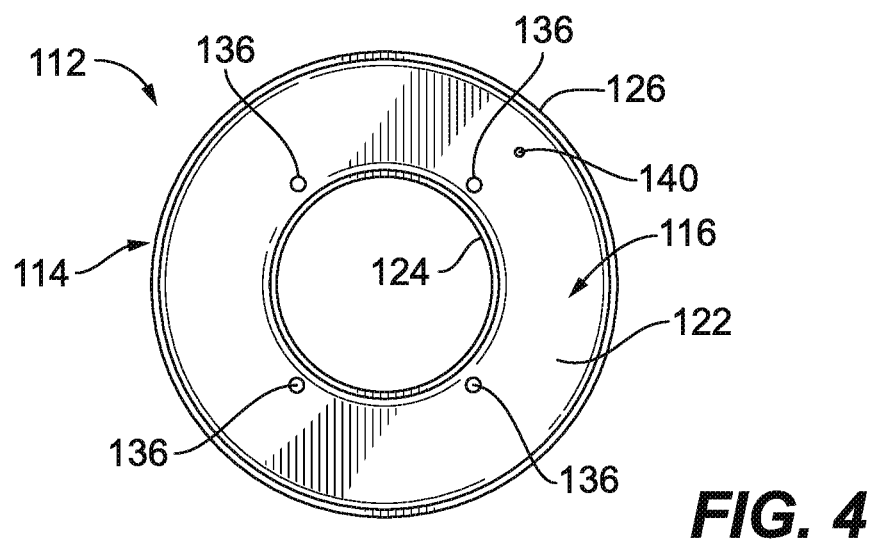
FIG. 4 is an end elevation view of the rotor end plate of FIG. 2, showing the interior surface.

With reference now to FIG. 4, the base 122 of the interior surface 116 is bounded by an inner rim 124 and an outer rim 126 radially opposite the inner rim, also shown in FIG. 3. The interior surface 116 is free of anti-rotation projections extending axially or radially therefrom. The outer rim 126 is free of anti-rotation features extending radially inward or outward therefrom. The inner rim 124 is free of anti-rotation features projecting radially outward or inward therefrom. The interior surface 116 is free of discrete pockets defined therein. As shown in FIGS. 2-3, the annular insulator sheet 120 has an outer perimeter 128 that is circumferentially uninterrupted and is free of anti-rotation features such as notches or protrusions, and an inner perimeter 130 that is also circumferentially uninterrupted and is free for antirotation features such as notches or protrusions.

Figure 5:
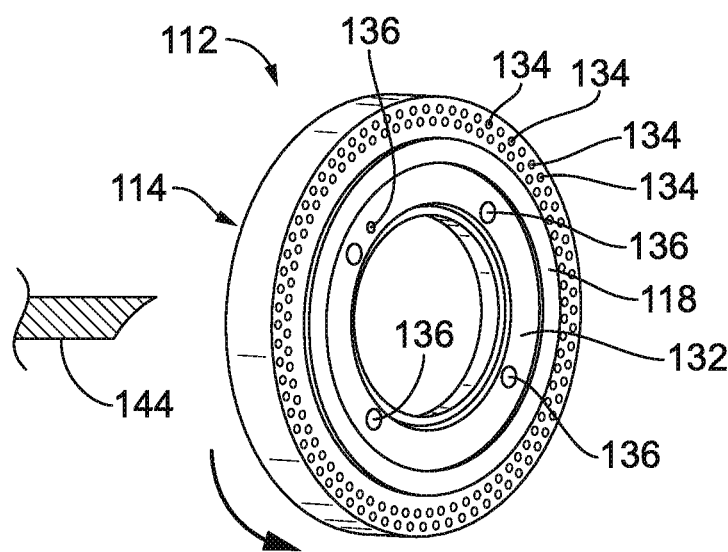
FIG. 5 is a perspective view of the rotor end plate of FIG. 2, showing the exterior surface and balancing bores.
Figure 6:
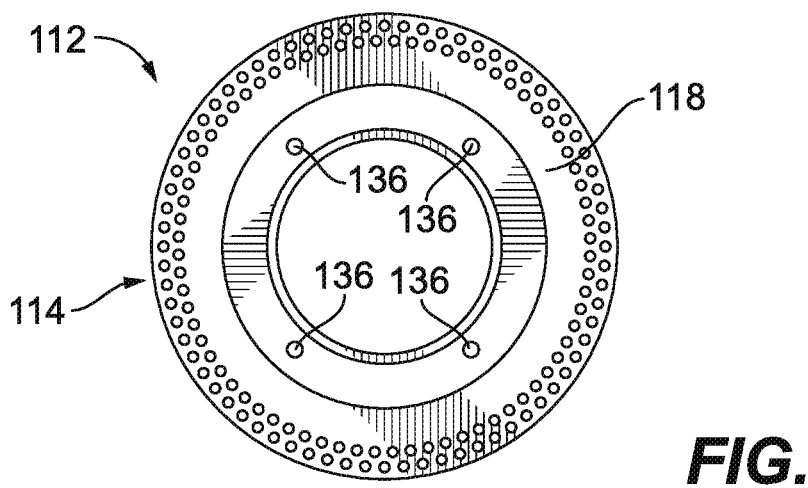
FIG. 6 is an end elevation view of the rotor end plate of FIG. 2, showing the exterior surface.

With reference now to FIGS. 5-6, the exterior surface 118 includes a full-annular pocket 132 that is free of axial and radial projections therein. The exterior surface 118 includes a plurality of balancing bores 134, which for the sake of clarity are not all labeled in FIG. 5. The bores 134 extend axially into the exterior surface 118, but do not need to pass all the way through the end rotor plate 112. The balancing bores 134 form an uninterrupted circumferential pattern fully around the exterior surface 118, and the rotor end plate 112 is balanced without any interruptions in that pattern due to the full annular interior and exterior surfaces 116 and 118 free from anti-rotation features.

With reference again to FIG. 2, a plurality of fastener bores 136 are defined axially through the end plate body 114, and respective fasteners 138 are received through the fastener bores 136 joining the end plate 112 to the rotor 104. A compression nut 139 cooperates with the fasteners 138 in joining the end plate 112 to the rotor 104. A roll pin bore 140 (shown in FIG. 4) is defined axially into the end plate body 114, and a roll pin 142 (shown in FIG. 3) is received in the roll bin bore 140 and is engaged with the rotor 104 and insulator sheet 120 for anti-rotation of the end plate 112 and insulator sheet 120 relative to the rotor 104.

Given the fully annular geometries in the interior surface 116 and the exterior surface 118, at least a portion of the interior surface 116 and at least a portion of the exterior surface 118 can be formed by a process including rotation on a lathe. This is advantageous in applications where the rotor end plate 112 includes titanium or other difficult to mill materials, compared to traditional configurations where pockets, anti-rotation features, and the like must be milled out of the work piece.

A method of making a rotor end plate, e.g., rotor end plate 112, for an electrical machine includes forming an interior surface, e.g. interior surface 116, on a rotor end plate using a lathe. FIG. 5 schematically indicates a lathe tool 144 for forming the interior and exterior surface portions and the circular arrow in FIG. 5 indicates the lathe turning direction. The method includes forming an exterior surface, e.g., exterior surface 118, axially opposed to the interior surface using a lathe. Forming the interior and exterior surfaces includes lathing the interior and exterior surfaces into a titanium rotor end plate work piece.

Due to the lack of pockets and anti-rotation features in the interior and exterior surfaces 116 and 118, there are less stresses on the end plate 112 relative to those in traditional end plates in high-speed applications. The end plate 112 can therefore be made thinner and lighter relative to traditional end plates.

The methods and systems of the present disclosure, as described above and shown in the drawings, provide for rotor end plates for electrical machines with superior properties including improved performance and ease of manufacture. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A rotor end plate for an electrical machine comprising: an annular end plate body with an interior surface and axially opposed exterior surface, wherein the interior surface defines a fully annular cavity for engaging a rotor of an electrical machine, wherein the interior surface has a base bounded by an inner rim and an outer rim radially opposite the inner rim, wherein the interior surface is free of anti-rotation projections extending axially therefrom and wherein the outer rim is free of anti-rotation features extending radially inward therefrom, wherein a plurality of fastener bores are defined axially through the end plate body, configured to receive fasteners to join the end plate to the rotor, wherein a roll pin bore is defined axially into the end plate body, configured to receive a roll pin for antirotation engaged with the rotor, wherein the roll pin bore is radially between the inner rim and outer rims of the end plate.

2. The rotor end plate as recited in claim 1, wherein the end plate body includes titanium.

3. The rotor end plate as recited in claim 1, wherein the inner rim is free of anti-rotation features projecting radially outward therefrom.

4. The rotor end plate as recited in claim 1, wherein the interior surface is free of discrete pockets defined therein.

5. The rotor end plate as recited in claim 1, wherein the exterior surface includes a full-annular pocket free of axial and radial projections therein.

6. The rotor end plate as recited in claim 1, wherein the exterior surface includes a plurality of balancing bores, wherein the balancing bores form an uninterrupted circumferential pattern fully around the exterior surface.

7. The rotor end plate as recited in claim 1, wherein at least a portion of the interior surface and at least a portion of the exterior surface are formed by a process including rotation on a lathe.

8. An electrical machine comprising:
a rotor including windings circumferentially spaced apart by rotor wedges; and
a rotor end plate mounted to the rotor including:
an annular end plate body with an interior surface and axially opposed exterior surface, wherein the interior surface includes a cavity for engaging the rotor, wherein the interior surface has a base bounded by an inner rim and an outer rim radially opposite the inner rim, wherein the interior surface is free of anti-rotation projections extending axially therefrom and wherein the outer rim is free of anti-rotation features extending radially inward therefrom, wherein a plurality of fastener bores are defined axially through the end plate body, and further comprising respective fasteners received through the fastener bores joining the end plate to the rotor, wherein a roll pin bore is defined axially into the end plate body, and further comprising a roll pin received in the roll bin bore and engaged with the rotor for anti-rotation relative to the rotor, wherein the roll pin bore is radially between the inner rim and outer rims of the end plate.

9. The electrical machine as recited in claim 8, wherein the inner rim is free of anti-rotation features projecting radially outward therefrom.

10. The electrical machine as recited in claim 8, wherein the interior surface is free of discrete pockets defined therein.

11. The electrical machine as recited in claim 8, wherein the exterior surface includes a full-annular pocket free of axial and radial projections therein.

12. The electrical machine as recited in claim 8, wherein the exterior surface includes a plurality of balancing bores, wherein the balancing bores form an uninterrupted circumferential pattern fully around the exterior surface.

13. The electrical machine as recited in claim 8, wherein at least a portion of the interior surface and at least a portion of the exterior surface are formed by a process including rotation on a lathe, and wherein the rotor end plate includes titanium.

14. The electrical machine as recited in claim 8, further comprising an annular insulator sheet engaged between the interior surface and the windings for electrical isolation of the windings from the rotor end plate, wherein the annular insulator sheet has an outer perimeter that is circumferentially uninterrupted and is free of anti-rotation features.

* * * * *